(12) United States Patent
Putt et al.

(10) Patent No.: US 7,329,451 B2
(45) Date of Patent: Feb. 12, 2008

(54) VEHICLE FLOOR MATS HAVING INTEGRAL HOOK RETENTION

(75) Inventors: Maureen R. Putt, Canton, OH (US); Timothy J. Allison, Old Fort, NC (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 349 days.

(21) Appl. No.: 10/931,869

(22) Filed: Sep. 1, 2004

(65) Prior Publication Data

US 2005/0079318 A1    Apr. 14, 2005

Related U.S. Application Data

(60) Provisional application No. 60/499,799, filed on Sep. 3, 2003.

(51) Int. Cl.
*B32B 3/06*      (2006.01)
*B32B 33/00*    (2006.01)

(52) U.S. Cl. .......................... 428/95; 428/99; 428/100; 296/97.23

(58) Field of Classification Search ................. 428/95, 428/99, 100, 86; 296/97.23
See application file for complete search history.

(56) References Cited

U.S. PATENT DOCUMENTS

| | | | | |
|---|---|---|---|---|
| 3,785,013 A | * | 1/1974 | Nugent ....................... 24/450 |
| 4,174,991 A | * | 11/1979 | Reuben ...................... 156/242 |
| 4,262,048 A | | 4/1981 | Mitchell ...................... 428/99 |
| 4,425,690 A | * | 1/1984 | Fraser et al. ................... 24/351 |
| 4,522,857 A | * | 6/1985 | Higgins ........................ 428/95 |
| 4,748,063 A | | 5/1988 | Reuben ........................ 428/78 |
| 4,765,670 A | | 8/1988 | Jackson ...................... 296/1 F |
| 4,822,658 A | * | 4/1989 | Pacione ....................... 428/95 |
| 4,829,627 A | * | 5/1989 | Altus et al. ..................... 16/4 |
| 4,856,654 A | | 8/1989 | Reuben |
| 4,968,548 A | | 11/1990 | Gibson et al. ................. 428/95 |
| 5,654,066 A | * | 8/1997 | Pacione ........................ 428/95 |
| D390,099 S | | 2/1998 | Bailey et al. ................. D8/387 |

(Continued)

FOREIGN PATENT DOCUMENTS

WO     WO 97/06029 A1    2/1997
WO     WO 2005/023577 A2    3/2005

OTHER PUBLICATIONS

International Search Report corresponding to PCT/US2004/028496, dated Mar. 16, 2005.

*Primary Examiner*—Cheryl Juska
(74) *Attorney, Agent, or Firm*—Myers Bigel Sibley & Sajovec, P.A.

(57) ABSTRACT

Floor mats that can be removably secured to loop pile carpeting within a vehicle include a surface layer having an aesthetic appearance, a backing layer in face-to-face contacting relationship with the surface layer, and a layer of scrim material integrally disposed within the backing layer, wherein the layer of scrim material comprises a plurality of hooks extending outwardly therefrom and through the backing layer in one or more locations. The hooks are configured to engage loops in floor carpeting within a vehicle when the floor mat is placed on the carpeting. Moreover, the size and density of the hooks are configured such that damage to the carpeting when the floor mat is removed from the carpeting is reduced.

25 Claims, 4 Drawing Sheets

U.S. PATENT DOCUMENTS

| | | | |
|---|---|---|---|
| 5,753,336 A * | 5/1998 | Stull ............................ | 428/86 |
| 5,804,273 A | 9/1998 | Drake, Jr. et al. ............ | 428/86 |
| 6,027,781 A | 2/2000 | Landry et al. ............. | 428/40.1 |
| 6,155,629 A | 12/2000 | Sherman | |
| 6,238,765 B1 | 5/2001 | Bailey et al. ................. | 428/95 |
| 6,296,733 B1 | 10/2001 | Hudkins et al. | |
| 6,298,624 B1 * | 10/2001 | Pacione ....................... | 52/511 |
| 6,381,806 B1 * | 5/2002 | Stanesic et al. .................. | 16/4 |
| 6,382,350 B1 * | 5/2002 | Jezewski et al. ............ | 181/290 |
| 6,406,085 B1 | 6/2002 | Stanesic ................. | 296/97.23 |
| 6,659,223 B2 * | 12/2003 | Allison et al. .............. | 181/290 |
| 6,821,366 B2 * | 11/2004 | Allison et al. ................ | 156/72 |
| 7,063,183 B2 * | 6/2006 | Allison et al. .............. | 181/290 |
| 7,093,879 B2 * | 8/2006 | Putt et al. ................ | 296/97.23 |
| 7,097,723 B2 * | 8/2006 | Allison et al. ................ | 156/72 |
| 7,105,069 B2 * | 9/2006 | Allison et al. ................ | 156/72 |
| 2006/0090832 A1 * | 5/2006 | Allison et al. ................ | 156/72 |
| 2007/0031634 A1 * | 2/2007 | Allison et al. ................ | 428/95 |
| 2007/0065628 A1 * | 3/2007 | Allison et al. ................ | 428/95 |

* cited by examiner

VEHICLE FLOOR MATS HAVING INTEGRAL HOOK RETENTION

RELATED APPLICATION

This application claims the benefit of U.S. Provisional Application No. 60/499,799 filed Sep. 3, 2003, the disclosure of which is incorporated herein by reference in its entirety as if set forth fully herein.

FIELD OF THE INVENTION

The present invention relates generally to floor mats and, more particularly, to floor mats for use within vehicles.

BACKGROUND OF THE INVENTION

With the demand for quality, comfort and aesthetic beauty regulating vehicle construction and design, including a vehicle's interior, vehicle manufacturers have responded by decorating vehicle interior floor boards with a unitary piece of carpet having a size and configuration that covers the entire floor board of at least the front portion of passenger compartments. This "wall-to-wall" look can be pleasing to the eye but can also be expensive to replace, especially in instances in which only a small portion of the unitary carpet piece becomes worn such as when a driver's feet have eroded the carpet in the vicinity of the brake and accelerator pedals. Accordingly, floor mats are often placed onto areas of carpeting that are subject to the most wear, i.e., where the driver's and passenger's feet normally rest.

Floor mats of the type which are normally and popularly used to protect the floor board carpeting in an automobile and which can be removed for cleaning are generally made of an elastomeric material and, optionally, can have a carpet layer secured to the elastomeric material. Generally, such an elastomeric automobile floor mat is made sufficiently flexible to conform to the various shapes and contours of automobile floors.

Floor mats can prolong the useful life of vehicle carpeting but can, upon a driver's or passenger's entry or exit from a vehicle, skid or shift along the carpeting surface. This shifting can be hazardous, especially if a floor mat is pushed too far under an accelerator pedal such as to cause the accelerator to stick or otherwise become impeded.

Numerous attempts have been made to address the problem of movement of floor mats relative to underlying floor board carpeting. U.S. Pat. No. 4,425,690 to Fraser et al. describes a clip for anchoring a floor mat to the floor board carpeting of an automobile. U.S. Pat. No. 6,381,806 to Stanesic et al. describes a two piece retainer assembly having an annular collar and a locking cover coupler that are forced together to trap a floor mat. While suitable for maintaining a floor mat in a fixed position relative to the floor board carpeting, a drawback of these conventional devices is that a floor mat cannot be easily and quickly removed, cleaned, and reinstalled.

Another attempt has involved the use of strips of hook and loop fasteners, for example, a first strip having mechanically interlocking members (e.g., hooks) secured to the back of a floor mat and a second strip having mechanically interlocking members (e.g., loops) secured to a floor board or to floor board carpeting in registration with the first strip. In general, hook and loop fastening systems include a male hook member, having a plurality of upstanding hook engaging elements, and a female loop member having a plurality of loops in which the hook members become ensnarled to effect fastening engagement of the two components. Drawbacks with this attempt are that only a small portion (e.g., the corners) of the bottom of a floor mat is conventionally secured to the carpeted floor board, and the floor mat must be properly aligned relative to the floor board for the portions of the hook and loop fasteners to fully engage each other.

It has also been proposed to adhesively attach strips of the hook portion of a hook and loop fastener to the back or bottom of a floor mat for use on carpeted floor boards having loop-pile fibers so that the hooks engage the loop-pile fibers of the carpeted floor board to hold the floor mat in place. A drawback with this approach is that the hooks of conventional hook and loop fasteners are formed from a rigid material which can damage floor board carpeting when the floor mat is removed, i.e., the hooks can pull the loop-pile fibers of the carpet material and cause the fibers to break and extend above the remaining intact loop-pile fibers. Furthermore, in manufacturing such a floor mat, separate operations or steps are required to adhesively attach each of the plurality of strips to the back of the floor mat.

SUMMARY OF THE INVENTION

In view of the above discussion, floor mats that can be removably secured to loop pile carpeting within a vehicle include a surface layer having an aesthetic appearance, a backing layer in face-to-face contacting relationship with the surface layer, and a layer of scrim material integrally disposed within the backing layer, wherein the layer of scrim material comprises a plurality of hooks extending outwardly therefrom and through the backing layer in one or more locations. The hooks are configured to engage loops in floor carpeting within a vehicle when the floor mat is placed on the carpeting. Moreover, the size and density of the hooks are configured such that damage to the carpeting when the floor mat is removed from the carpeting is reduced. Because the scrim material is integrally disposed within the backing layer material, the hooks cannot be removed from the floor mat.

According to embodiments of the present invention, the hooks extend outwardly from the scrim material and through the backing layer over the entire surface of the backing layer. According to other embodiments of the present invention, the hooks extend outwardly from the scrim material and through the backing layer at a plurality of spaced apart locations.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
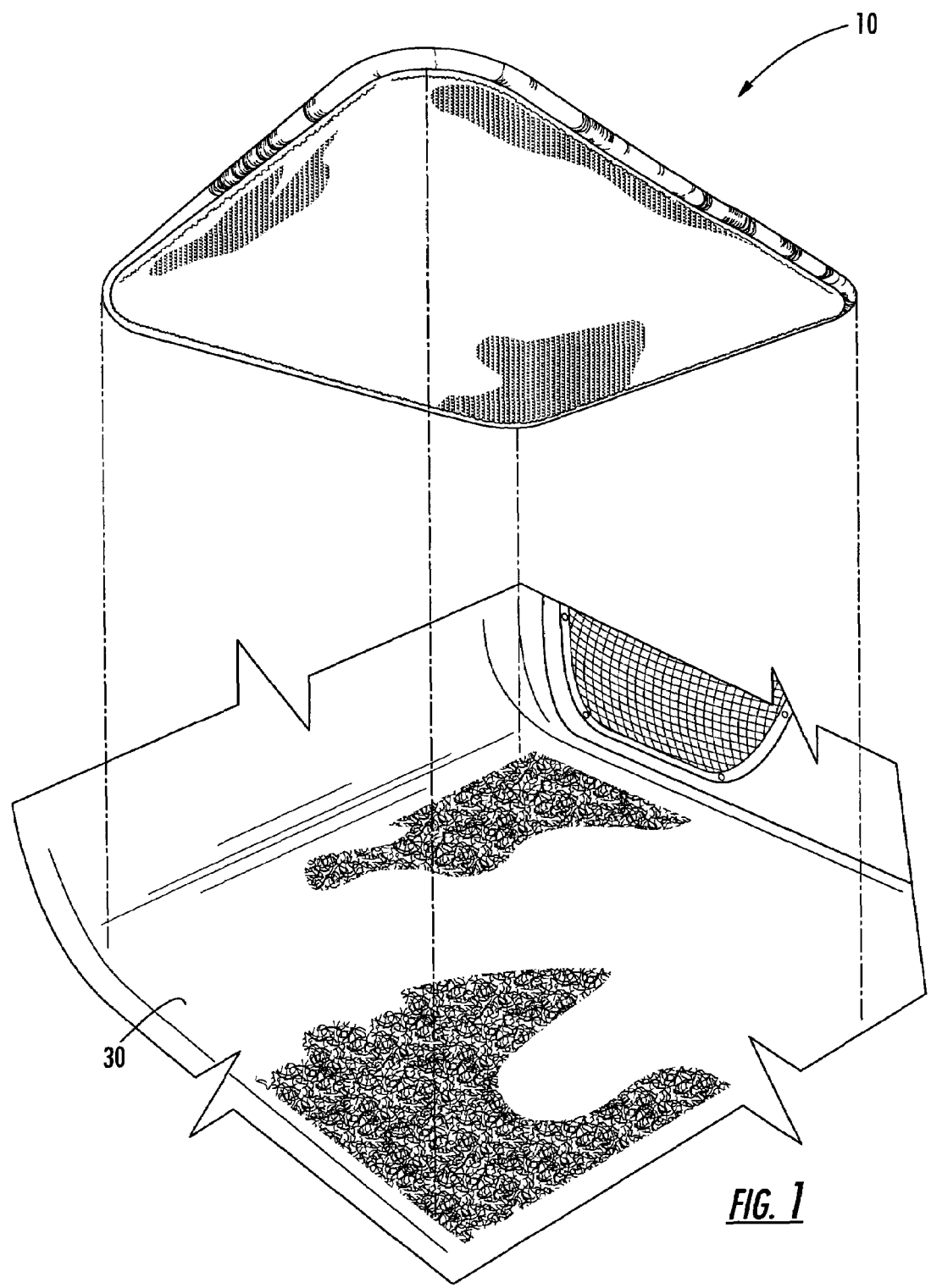
FIG. 1 is a perspective view of a floor mat having a plurality of hooks integrally formed with the backing layer of the floor mat, according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. Terms such as "upward", "downward", "vertical", "horizontal", and the like, used herein are for the purpose of explanation only.

Figure 2:
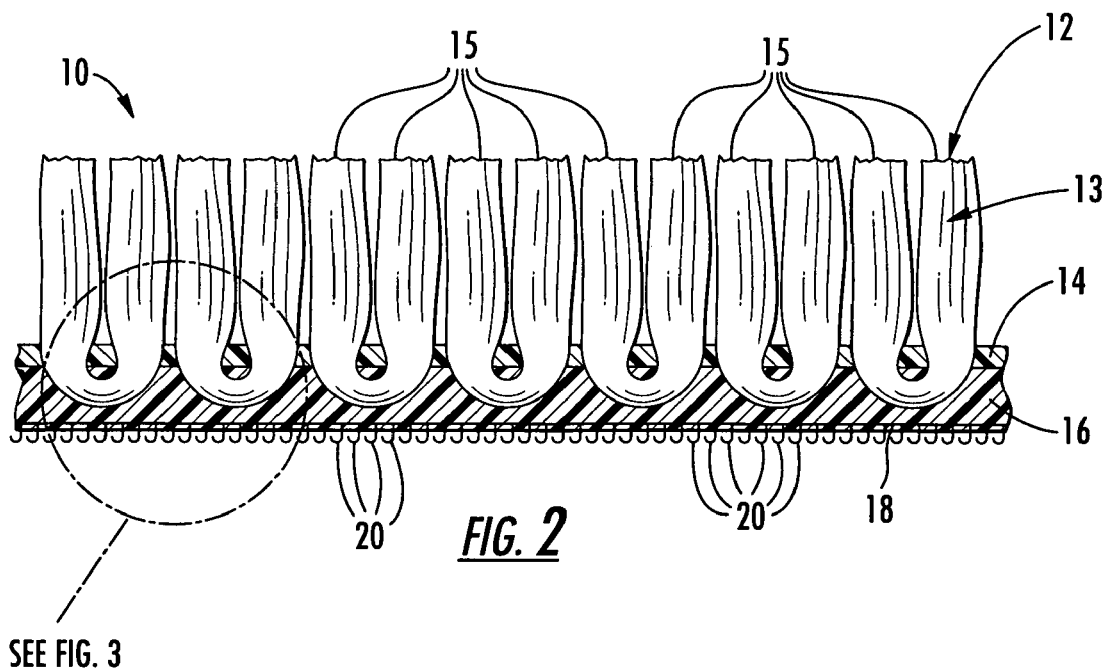
FIG. 2 is an enlarged cross-sectional view of a portion of the floor mat of FIG. 1.
Figure 3:
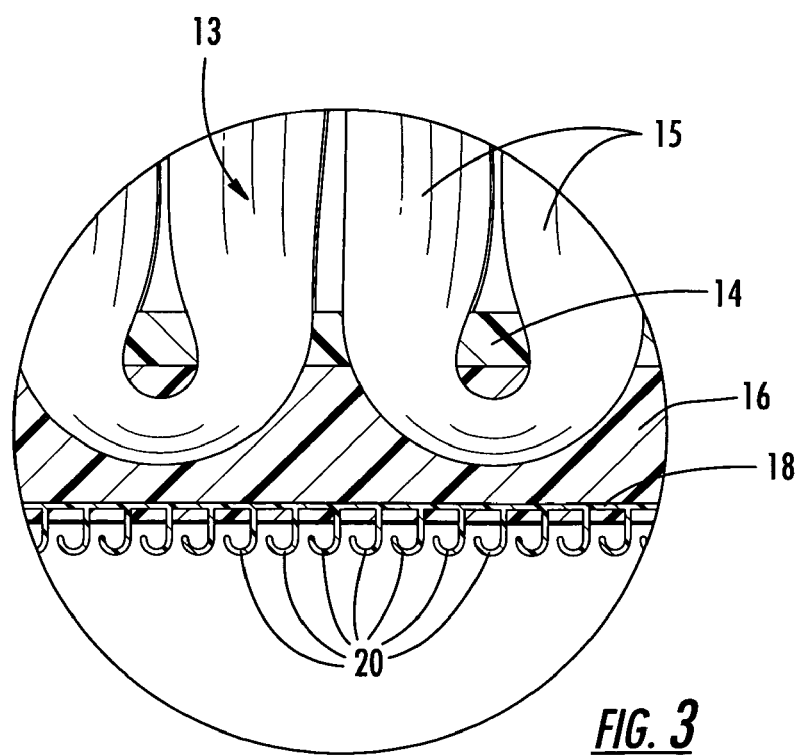
FIG. 3 is a further enlarged cross-sectional view of a portion of the floor mat of FIG. 1 illustrating the scrim layer and hooks integrally formed within the backing layer.

Referring now to FIGS. 1-3, a floor mat 10 for vehicle floors, according to an embodiment of the present invention, is illustrated. The illustrated floor mat 10 includes a surface layer 12, a backing layer 16 in face-to-face contacting relationship with the surface layer 12, and a layer of scrim material 18 integrally disposed within the backing layer 16.

Embodiments of the present invention are not limited to the illustrated floor mat construction of FIGS. 1-3. Floor mats, according to embodiments of the present invention, may include additional layers of material for acoustic absorption/deflection, water management, air flow management, etc.

In the illustrated embodiment, the surface layer 12 has a tufted pile carpet construction, i.e., a plurality of pile yarns 13 extend through a primary backing 14 to form loops which are cut to form tufts 15. The fibers of the pile yarns 13 can be composed of natural or synthetic fibers and may be thermoplastic or thermosetting. Carpet fibers that may be employed in the illustrated surface layer 12 include those described in U.S. Pat. No. 4,174,991 to Reuben, the disclosure of which is incorporated herein by reference as if set out fully, and include polyamide fibers such as nylon fibers, particularly nylon 6 and nylon 66, polyester fibers, acrylic fibers, polypropylene and blends and copolymers thereof.

The backing layer 16 may be formed from virtually any type of material. For example, the backing layer 16 may be formed from any natural and synthetic polymeric materials. In addition, the backing layer 16 may be a layer of non-woven material or have a foam construction, for example.

Embodiments of the present invention are not limited to a surface layer 12 that has a tufted pile carpet construction. The surface layer 12 may be a woven carpet material, non-woven carpet material, cut pile carpet material, needle punched carpet material or the like, and may be backed or unbacked. In addition, the surface layer 12 may be a non-carpet material. For example, the surface layer 12 may be a layer of thermoplastic material. Exemplary thermoplastic materials include, but are not limited to, polyvinyl chloride, polyethylene, ethylene vinyl acetate, polypropylene, polystyrene, thermoplastic rubber, and blends thereof.

The layer of scrim material 18 includes a plurality of hooks 20 extending downwardly therefrom and through the backing layer 16 in one or more locations, as illustrated. The hooks 20 are configured to engage loops in the carpeting 30 of a vehicle when the floor mat 10 is placed on the carpeting. In addition, the hooks 20 are configured such that no damage to the vehicle carpeting is done when the floor mat 10 is removed therefrom. Specifically, the hooks 20 are configured such that floor board carpeting fuzzing and fiber pull-out is reduced.

According to embodiments of the present, hook density may be between about 30 and 400 hooks per square centimeter. However, embodiments of the present invention are not limited to this range of hook densities. Individual hook length may be between about 0.5 millimeter (mm) and about 3 mm, however, other lengths may be utilized.

In the illustrated embodiment, the hooks 20 have a "J" shape. However, the hooks 20 may have various shapes and configurations as long as they are capable of releasably engaging loops in vehicle carpeting. Embodiments of the present invention are not limited to the configurations of FIGS. 4-5. Hooks 20 can extend through (or from) the backing layer 16 in various patterns, sizes and orientations including, for example, continuous strips that extend from edge to edge of a mat.

According to other embodiments of the present invention, the layer of scrim material 18 having a plurality of hooks 20 extending downwardly therefrom may be laminated to, or otherwise directly attached to, the backing layer 16 in face-to-face contacting relationship therewith.

Figure 4:
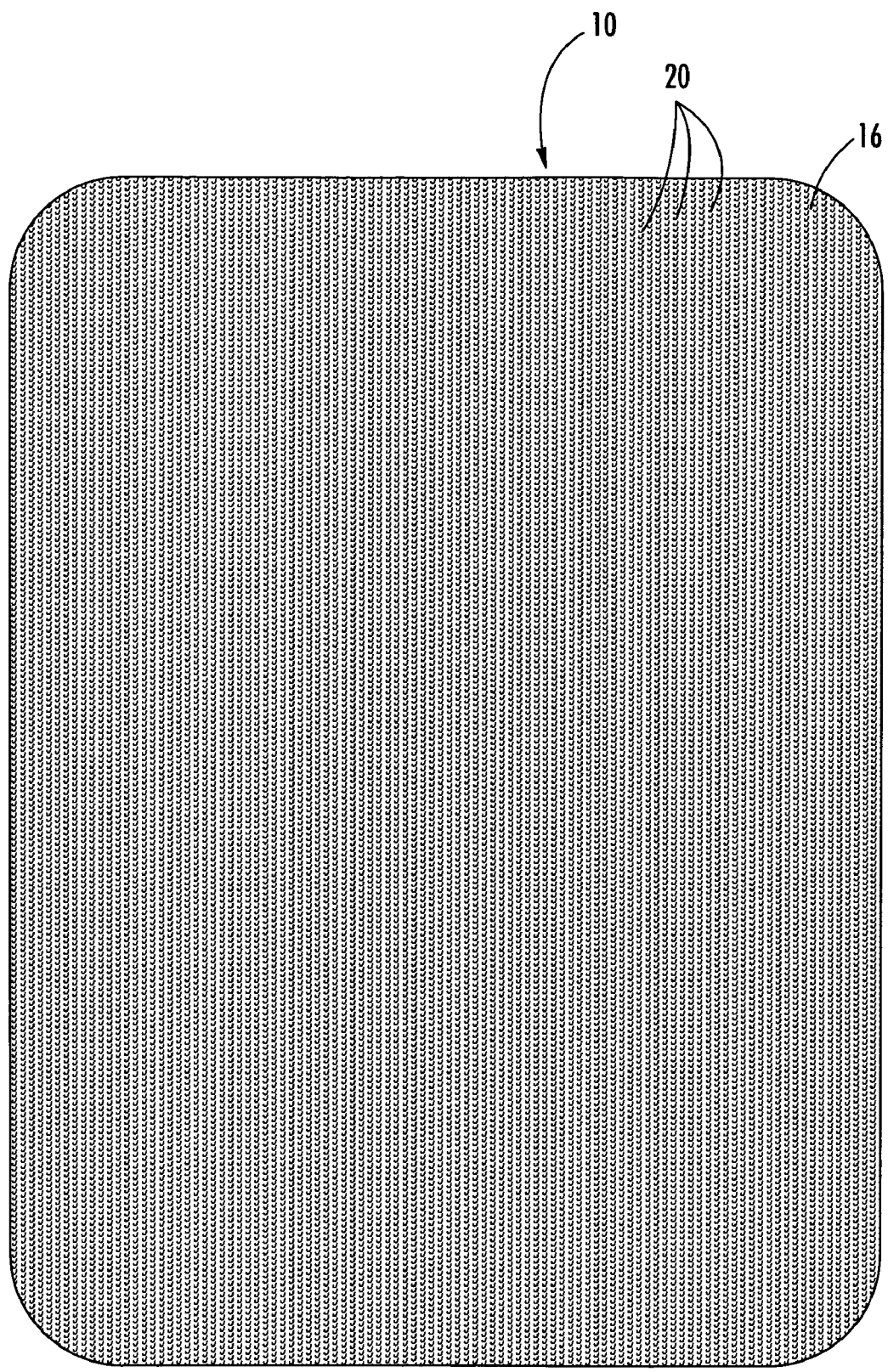
FIG. 4 is a plan view of the backing layer of the floor mat of FIG. 1 illustrating the hooks extending through the backing layer over the entire surface of the backing layer, according to embodiments of the present invention.
Figure 5:
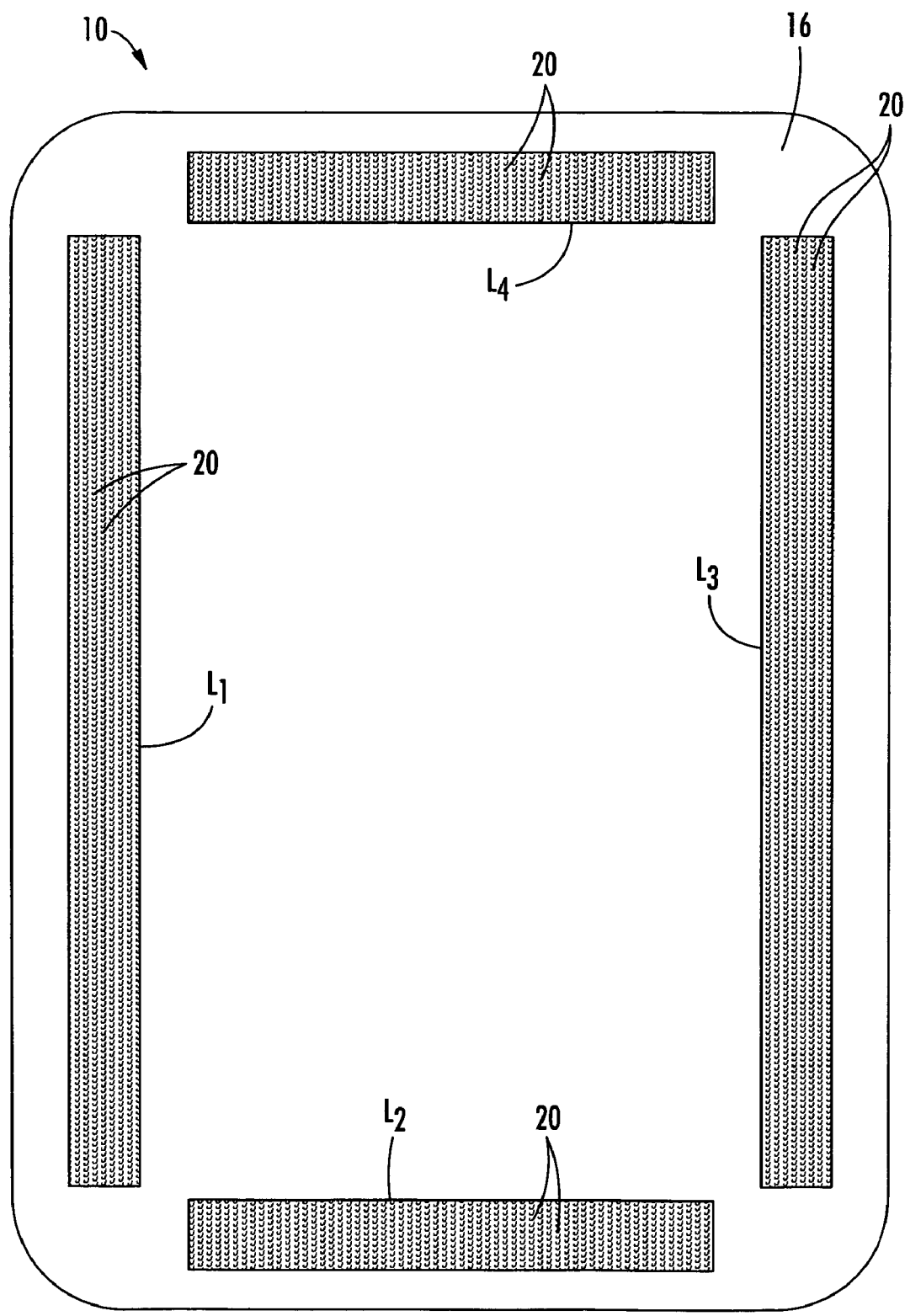
FIG. 5 is a plan view of the backing layer of the floor mat of FIG. 1 illustrating hooks extending through the backing layer only in specific locations, according to embodiments of the present invention.

In the illustrated embodiment of FIG. 4, the hooks 20 extend through the backing layer 16 over the entire surface of the backing layer 16. In the embodiment illustrated in FIG. 5, the hooks 20 extend through the backing layer 14 only in specific locations $L_1$-$L_4$.

The material utilized to produce the hooks 20 may be varied to achieve the desired level of bond/release. For particular carpet materials, a softer hook may be desired to achieve the desired release (a soft hook could be produced from products such as polyethylene, etc.). Hook material could be produced from a variety of materials such as polyethylene, polypropylene, nylon, polyvinylchloride, styrene, etc.

The combination of hook type, hook density, and carpet type can be varied to achieve an optimal level of grip and release required to protect a carpet surface.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A floor mat for a vehicle, wherein the vehicle has a floorboard covered with loop pile carpeting, the floor mat comprising:

a surface layer having an aesthetic appearance;
a backing layer in face-to-face contacting relationship with the surface layer; and
a layer of scrim material integrally disposed within the backing layer, wherein the layer of scrim material comprises a plurality of hooks extending outwardly therefrom and through the backing layer in one or more locations, wherein the hooks are configured to engage loops in the carpeting when the floor mat is placed on the carpeting, and wherein the hooks are configured such that damage to the carpeting when the floor mat is removed from the carpeting is reduced.

2. The floor mat of claim 1, further comprising one or more additional layers of material disposed between the surface layer and backing layer.

3. The floor mat of claim 1, wherein the one or more additional layers of material are acoustically absorptive and/or deflective.

4. The floor mat of claim 1, wherein the surface layer comprises a thermoplastic material.

5. The floor mat of claim 4, wherein the thermoplastic material is selected from the group consisting of polyvinyl chloride, polyethylene, ethylene vinyl acetate, polypropylene, polystyrene, and thermoplastic rubber.

6. The floor mat of claim 1, wherein the surface layer comprises carpeting.

7. The floor mat of claim 1, wherein hook density is between about 30 and 400 hooks per square centimeter.

8. The floor mat of claim 1, wherein individual hook length is less than or equal to about 3 millimeters.

9. The floor mat of claim 1, wherein the plurality of hooks extend outwardly from the scrim material and through the backing layer over the entire surface of the backing layer.

10. The floor mat of claim 1, wherein the plurality of hooks extend outwardly from the scrim material and through the backing layer at a plurality of spaced apart locations.

11. A floor mat for a vehicle, wherein the vehicle has a floorboard covered with loop pile carpeting, the floor mat comprising:
a surface layer having an aesthetic appearance;
a backing layer in face-to-face contacting relationship with the surface layer; and
a layer of scrim material integrally disposed within the backing layer, wherein the layer of scrim material comprises a plurality of hooks extending outwardly therefrom and through the backing layer in one or more locations, wherein the hooks are configured to releasably engage loops in the carpeting when the floor mat is placed on the carpeting, wherein hook density is between about 30 and 400 hooks per square centimeter, and wherein individual hook length is less than or equal to about 3 millimeters.

12. The floor mat of claim 11, further comprising one or more additional layers of material disposed between the surface layer and backing layer.

13. The floor mat of claim 11, wherein the one or more additional layers of material are acoustically absorptive and/or deflective.

14. The floor mat of claim 11, wherein the surface layer comprises a thermoplastic material.

15. The floor mat of claim 14, wherein the thermoplastic material is selected from the group consisting of polyvinyl chloride, polyethylene, ethylene vinyl acetate, polypropylene, polystyrene, and thermoplastic rubber.

16. The floor mat of claim 11, wherein the surface layer comprises carpeting.

17. The floor mat of claim 11, wherein the plurality of hooks extend outwardly from the scrim material and through the backing layer over the entire surface of the backing layer.

18. The floor mat of claim 11, wherein the plurality of hooks extend outwardly from the scrim material and through the backing layer at a plurality of spaced apart locations.

19. A floor mat for a vehicle, wherein the vehicle has a floorboard covered with loop pile carpeting, the floor mat comprising:
a surface layer having an aesthetic appearance;
a backing layer in face-to-face contacting relationship with the surface layer; and
a layer of scrim material integrally disposed within the backing layer, wherein the layer of scrim material comprises a plurality of hooks extending outwardly therefrom and through the backing layer over the entire surface of the backing layer, wherein the hooks are configured to engage loops in the carpeting when the floor mat is placed on the carpeting, wherein individual hook length is less than or equal to about 3 millimeters.

20. The floor mat of claim 19, further comprising one or more additional layers of material disposed between the surface layer and backing layer.

21. The floor mat of claim 19, wherein the one or more additional layers of material are acoustically absorptive and/or deflective.

22. The floor mat of claim 19, wherein the surface layer comprises a thermoplastic material.

23. The floor mat of claim 22, wherein the thermoplastic material is selected from the group consisting of polyvinyl chloride, polyethylene, ethylene vinyl acetate, polypropylene, polystyrene, and thermoplastic rubber.

24. The floor mat of claim 19, wherein the surface layer comprises carpeting.

25. The floor mat of claim 19, wherein hook density is between about 30 and 400 hooks per square centimeter.

* * * * *